(12) United States Patent
Colley, III et al.

(10) Patent No.: US 6,492,745 B1
(45) Date of Patent: Dec. 10, 2002

(54) BATTERY DISCONNECT SYSTEM

(75) Inventors: William C. Colley, III, Oberlin, OH (US); James A. Giancaterino, Sheffield Lake, OH (US)

(73) Assignee: Marconi Communications, Inc., Cleveland, OH (US)

( * ) Notice: Subject to any disclaimer, the term of this patent is extended or adjusted under 35 U.S.C. 154(b) by 311 days.

(21) Appl. No.: 09/618,085

(22) Filed: Jul. 17, 2000

(51) Int. Cl.[7] .................................................. H02J 7/00
(52) U.S. Cl. ............................ 307/66; 307/64; 307/81; 307/85; 307/150
(58) Field of Search ............................ 307/66, 81, 64, 307/85, 150

(56) References Cited

U.S. PATENT DOCUMENTS 3,609,504 A * 9/1971 Barker et al. .................. 320/7
6,049,141 A * 4/2000 Sieminski et al. ............ 307/44

* cited by examiner

Primary Examiner—Stephen W. Jackson
Assistant Examiner—Robert L. Deberadinis
(74) Attorney, Agent, or Firm—Jones, Day, Reavis & Pogue

(57) ABSTRACT

A battery control system for controlling the connection of a plurality of batteries to a load is provided. The system comprises a plurality of switches and a plurality of controllers. Each switch is operable to connect or disconnect one of the batteries from the load. Each controller is operatively coupled to one of the switches. Each controller is operative to cause one of the switches to disconnect one of the batteries from the load. Each controller has an input and an output for communicating with another controller wherein the controllers communicate with each other to limit the number of batteries that can be disconnected from the loads

48 Claims, 6 Drawing Sheets

BATTERY DISCONNECT SYSTEM

FIELD OF THE INVENTION

The present invention relates to the field of power management systems. In particular, the present invention relates to power management systems for back-up power sources.

BACKGROUND OF THE INVENTION

In the telecommunications industry, telecommunication loads are normally provided with DC power by an AC to DC converter. To ensure that telecommunication services are not interrupted when there is an AC power outage, battery strings are typically employed as back-up power sources. These battery back-up systems usually comprise multiple battery strings that are connected in parallel. In these back-up systems, each battery string is responsible for meeting a fractional portion of the load power demands.

It is often desirable to disconnect the battery string from the load, for example, for maintenance purposes or to replace the battery string. As a result, multiple battery strings may be disconnected at the same time.

There are many disadvantages, however, to allowing multiple battery strings to be simultaneously disconnected. First, if too many battery strings are disconnected at the same time, the Uninterruptable Power System ("UPS") may not operate safely. When multiple battery strings are used, each battery string is responsible for meeting a fractional portion of the load current demand. In view of this, the cabling and connectors used to couple the battery strings to the power bus are selected to safely handle the expected current to be supplied by the battery strings. If multiple battery strings are disconnected from the power bus, the remaining batteries must provide increased current to meet the load demands.

For example, if the load demand is 4000 Amperes and there are 8 battery strings connected in parallel to provide power to the load during A.C. power outages, each battery string is responsible for providing 500 Amperes. If one battery string is disconnected, then the remaining batteries must now provide 571 Amperes. But if four battery strings are disconnected, the remaining batteries must provide 1000 Amperes.

The increased current levels supplied by the remaining batteries may surpass the level at which the cabling and connectors connected thereto can safely conduct current. The cabling and connectors could be sized larger to handle increased current levels, but this potential solution may needlessly increase the cost and installation complexities when in most instances the increased capacity is not be needed. Also, when multiple battery strings are simultaneously disconnected, the increased load demand on the remaining battery strings will decrease the length of time the remaining battery strings can provide power.

Therefore, there remains a need for a system that limits the number of battery strings that may be disconnected from the load to ensure that the battery back-up system can safely deliver power when needed.

SUMMARY OF THE INVENTION

The present invention meets the foregoing needs by providing a system that limits the number of battery strings that can be disconnected at a power plant at a given time. The system groups battery strings into one or more rings wherein the number of batteries within a ring that can be disconnected is limited. One or more controllers are provided for each ring that cooperate with the other controllers within the ring to limit the number of batteries that may be disconnected from the load at a given time.

The present invention provides many advantages over the presently known power management systems. Not all of these advantages are simultaneously required to practice the invention as claimed, and the following list is merely illustrative of the types of benefits that may be provided, alone or in combination, by the present invention. These advantages include: (1) limiting the number of batteries that can be disconnected from the load at one time; (2) preventing accidental disconnection of battery strings; (3) a lockout/tagout feature that prevents accidental reconnection during maintenance; (4) allowing a single controller to be removed from the ring without affecting the other controllers; (5) allowing multiple rings to be established within large power systems; and (6) providing an emergency disconnection feature to disconnect all battery strings in an emergency situation when all DC power must be removed.

In accordance with the present invention, a battery control system for controlling the connection of a plurality of batteries to a load is provided. The system comprises a plurality of switches and a plurality of controllers. Each switch is operable to connect or disconnect one of the batteries from the load. Each controller is operatively coupled to one of the switches. Each controller is operative to cause one of the switches to disconnect one of the batteries from the load. Each controller has an input and an output for communicating with other controllers wherein the controllers communicate with each other to limit the number of batteries that can be disconnected from the load.

An UPS system having a plurality of batteries for providing backup power to a load is provided that comprises a plurality of switches and a plurality of controllers. Each switch is operable to connect or disconnect one of the batteries from the load. Each controller is operatively coupled to one of the switches. Each controller is operative to cause one of the switches to disconnect one of the batteries from the load. Each controller has an input and an output for communicating with other controllers wherein the controllers communicate with each other to limit the number of batteries that can be disconnected from the load.

A power plant for providing power to a load is provided. The power plant comprises a source of AC power, an AC to DC power converter for converting the AC power to DC power and for supplying the DC power to the load, and an UPS system for providing backup DC power to the load, the UPS system comprising a plurality of batteries. The power plant further comprises a plurality of switches and a plurality of controllers. Each switch is operable to connect or disconnect one of the batteries from the load. Each controller is operatively coupled to one of the switches. Each controller is operative to cause one of the switches to disconnect one of the batteries from the load. Each controller has an input and an output for communicating with other controllers wherein the controllers communicate with each other to limit the number of batteries that can be disconnected from the load.

BRIEF DESCRIPTION OF DRAWINGS

The present invention will become more apparent from the following description when read in conjunction with the accompanying drawings wherein.

DETAILED DESCRIPTION OF THE PREFERRED EMBODIMENTS

Figure 1:
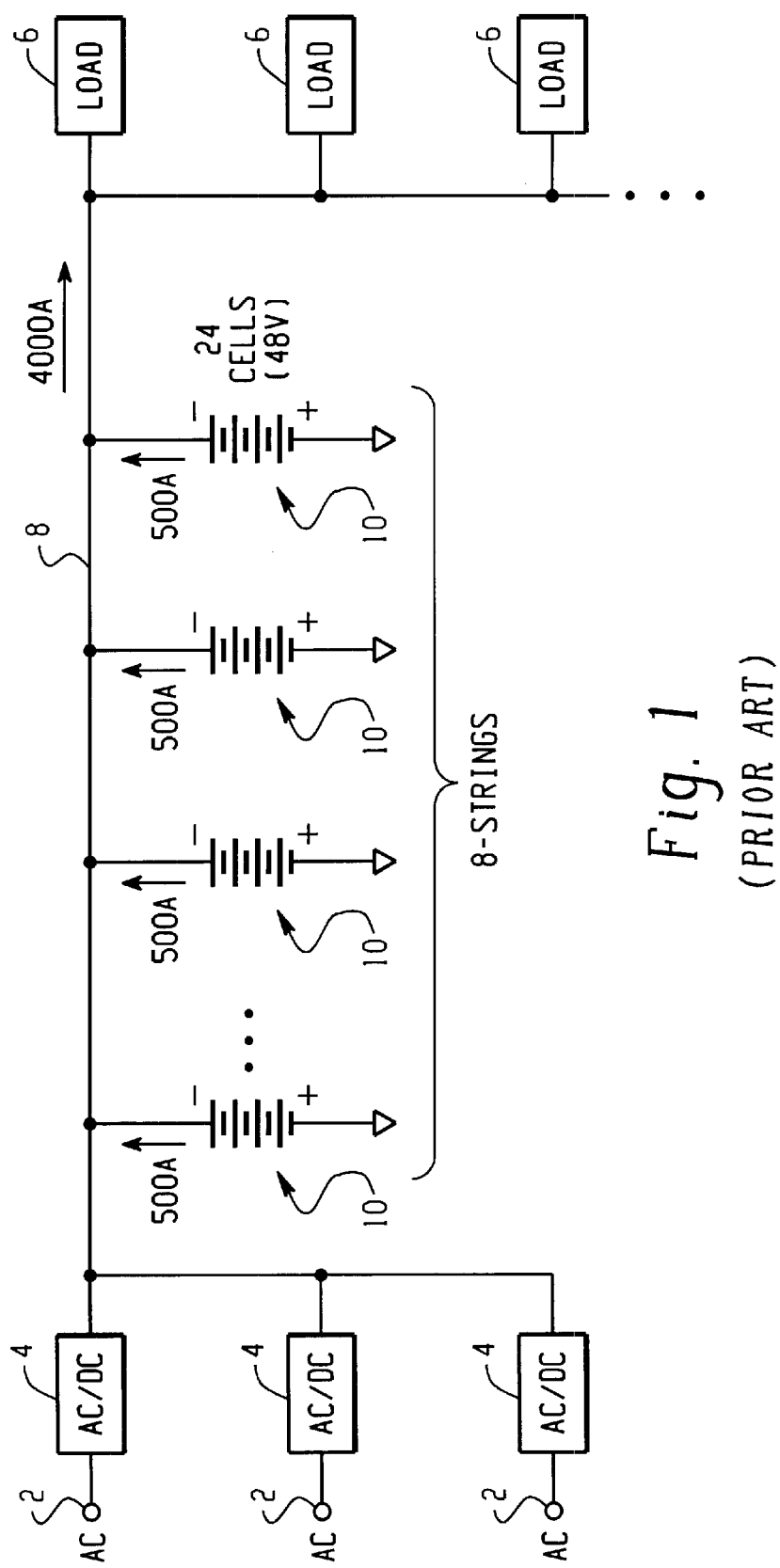
FIG. 1 is a schematic view of an exemplary power plant in which the present invention is useful.

Referring now to the figures, FIG. 1 sets forth a schematic view of an exemplary power plant for a telecommunication system in which the present invention is particularly useful. AC power is supplied via terminals 2 to one or more power converters 4 that convert the AC power to DC power. The DC power leaving the power converters 4 is coupled to the load 6 via a power bus 8 to provide power to the load 6. The system also includes a plurality of batteries or battery strings 10 that are coupled in parallel. The battery strings 10 are coupled via the power bus 8 to the load 6. The battery stings 10 collectively function as an uninterruptable power source ("UPS") system and provides power to the load 6 when there is an interruption in the power from the power converter 4.

In the power plant, a contactor or other switch may be installed in series with each battery string 10, between the battery string 10 and the power bus 8, to allow the battery string 10 to be disconnected from the power bus 8 and the load 6. It is often desirable to disconnect the battery string 10 from the power bus 8, for example, for maintenance purposes or to replace the battery string 10. In such a power plant, it is possible that multiple battery strings may be disconnected at the same time. There are many disadvantages, however, to allowing multiple battery strings to be simultaneously disconnected.

First, if too many battery strings are disconnected at the same time, the UPS system may not operate safely. When multiple battery strings are used, each battery string is responsible for meeting a fractional portion of the load current demand. In view of this, the cabling and connectors used to couple the battery strings to the power bus are selected to safely handle the expected current to be supplied by the battery strings. If multiple battery strings are disconnected from the power bus, the remaining batteries must provide increased current to meet the load demands.

For example, if the load demand is 4000 Amperes and there are 8 battery strings connected in parallel to provide power to the load during A.C. power outages, each battery string is responsible for providing 500 Amperes. If one battery string is disconnected, then the remaining batteries must now provide 571 Amperes. But if four battery strings are disconnected, the remaining batteries must provide 1000 Amperes.

The increased current levels supplied by the remaining batteries may surpass the level at which the cabling and connectors connected thereto can safely conduct current. The cabling and connectors could be sized larger to handle increased current levels, but this potential solution may needlessly increase the cost and installation complexities when in most instances the increased capacity is not be needed. Also, when multiple battery strings are simultaneously disconnected, the increased load demand on the remaining battery strings will decrease the length of time the remaining battery strings can provide power.

To overcome these problems and to provide other advantages, the present invention provides, in a preferred embodiment, an interlock ring system that ensures that only a safe number of battery strings may be disconnected at a power plant at a given time. Advantages provided by the present invention may include increased safety, reduced cost, and reduced conductor and connector sizes.

Figure 2:
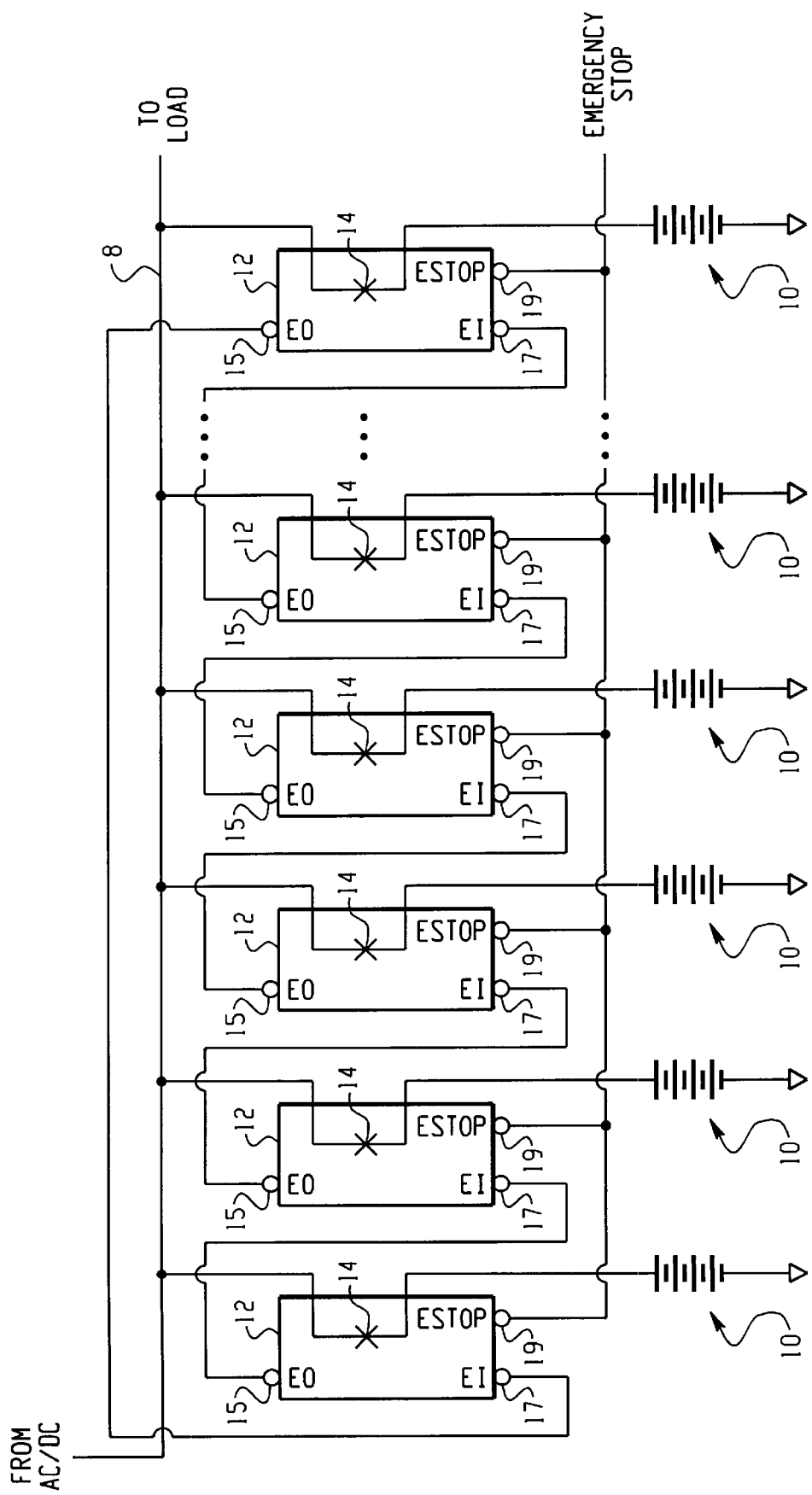
FIG. 2 is a schematic view of a series of contactor modules connected in a ring configuration.
Figure 3:
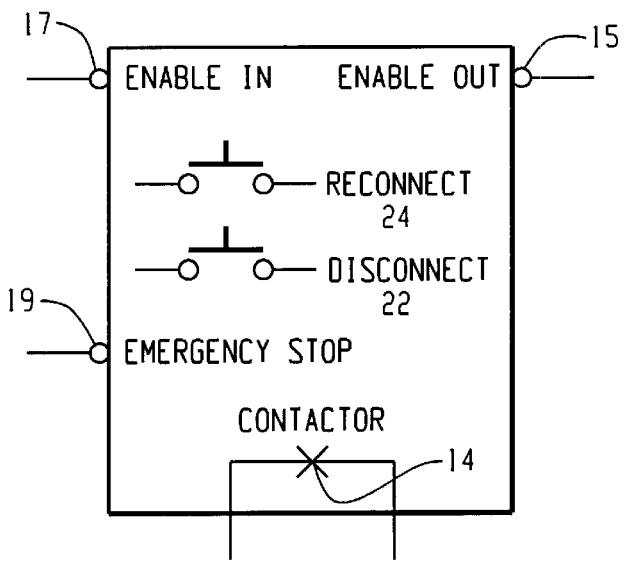
FIG. 3 is a simplified block diagram of a contactor module.
Figure 4:
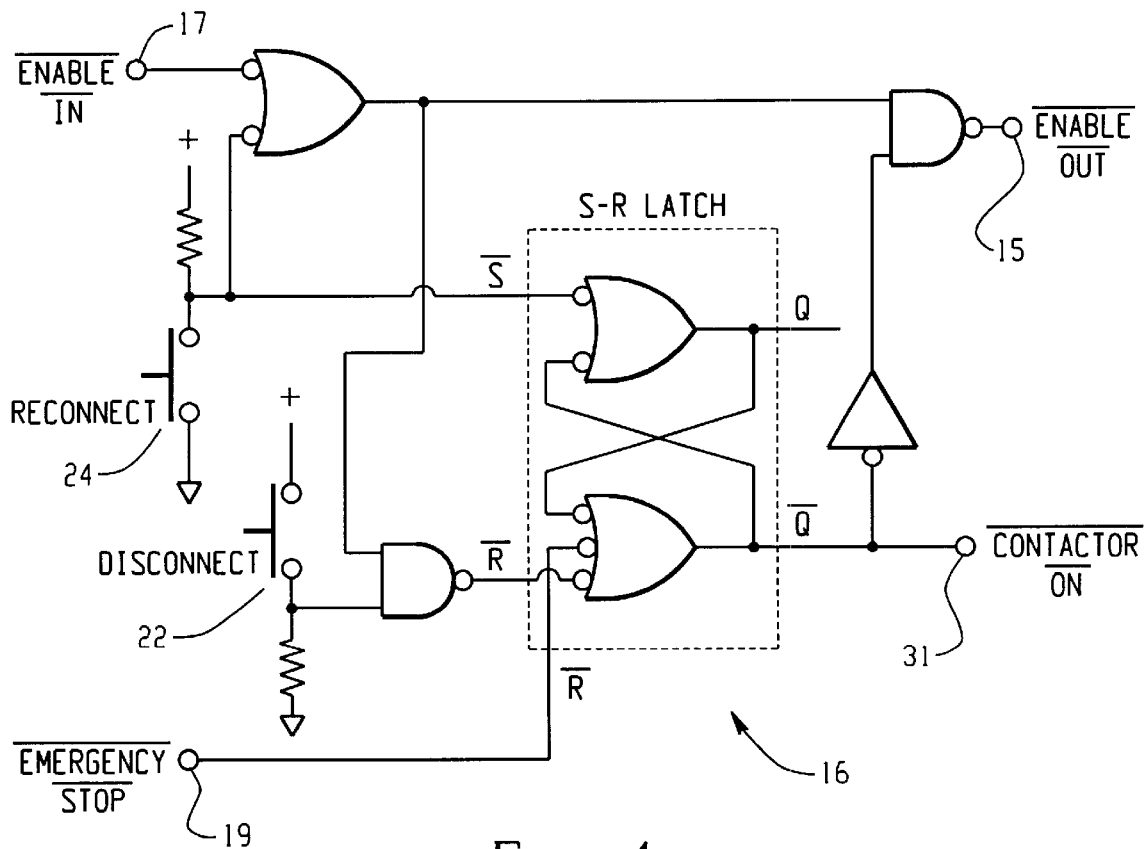
FIG. 4 is a simplified schematic view of a preferred contactor module.

As shown in FIGS. 2–4, in the preferred system according to the present invention each battery string 10 has a contactor module 12 coupled in series between the battery string 10 and the power bus 8. The contactor module 12 comprises a contactor or switch 14 and a controller 16 that controls the actuation of the contactor 14.

The switch or contactor 14 is the device that connects the battery to or disconnects the battery from the power bus 8. Preferably, the switch or contactor 14 has two states: and open state which causes the battery 10 to be disconnected from the power bus 8 and a closed state which causes the battery 10 to be connected to the power bus 8. A number of device could be used as a switch or contactor 14 such as a relay, a mechanical switch, an electromagnetic switch, a motorized circuit breaker and other types of switches. The preferred contactor 14 is a Prestolite part number JHA-4101N. The controller 16 preferably comprises logic circuitry and includes an ENABLE OUT connection point 15 and an ENABLE IN connection point 17.

The present invention provides a method for grouping the batteries 10 at the power plant into one or more groups called rings. The controllers 16 associated with each battery string 16 are coupled to other controllers 16 via the ENABLE OUT connection points 15 and the ENABLE IN connection points 17 to form the rings.

The rings are formed by coupling the ENABLE OUT 15 of a first contactor module 12 to the ENABLE IN 17 of a second contactor module 12. The ENABLE OUT 15 of the second contactor module 12 is then coupled to the ENABLE IN 17 of a third contactor module 12. This connection methodology is repeated until all that remains to be connected in the ring is the ENABLE OUT 15 of the last contactor module 12 and the ENABLE IN 17 of the first contactor modules 12. The ring is, therefore, completed by coupling the ENABLE OUT 15 of the last contactor module 12 to the ENABLE IN 17 of the first contactor modules 12.

For example, in a three contactor module ring, the ENABLE OUT 15 of a first contactor module 12 is connected to the ENABLE IN 17 of the second contactor module 12 in the chain. The ENABLE OUT 15 of a second contactor module 12 is connected to the ENABLE IN 17 of the third contactor module 12. Finally, the ENABLE OUT 15 of a third contactor module 12 is connected to the ENABLE IN 17 of the first contactor module 12 to complete the ring.

Within a ring, the controller 16 of each contactor module 12 cooperates with other controllers 16 in the ring to limit the number of battery strings 10 that may be disconnected from the power bus 8 at a given instance. In the preferred system, the controllers 16 cooperated to prevent more than one battery string 10 in the ring from being disconnected from the power bus 8.

The preferred contactor module 12 further comprises a disconnect switch 22, a reconnect switch 24, and an emergency stop connection point 19. The disconnect switch 22 is used to communicate to the controller 16 a request that a battery 10 be disconnected from the power bus 8. The reconnect switch 24 is used to communicate to the controller 16 that a battery 10 is to be reconnected to the power bus 8.

The emergency stop 19 allows for a safety override feature to be implemented within the contactor module 12. Each contractor module 12, when is receives an emergency stop signal through the emergency stop 19, will disconnect its battery from the power bus 8. The controller 16 also has a CONTACTOR ON output 31 that sends a control signal to the contactor 14 directing the contactor 14 to enter the open or closed state.

Figure 5A:
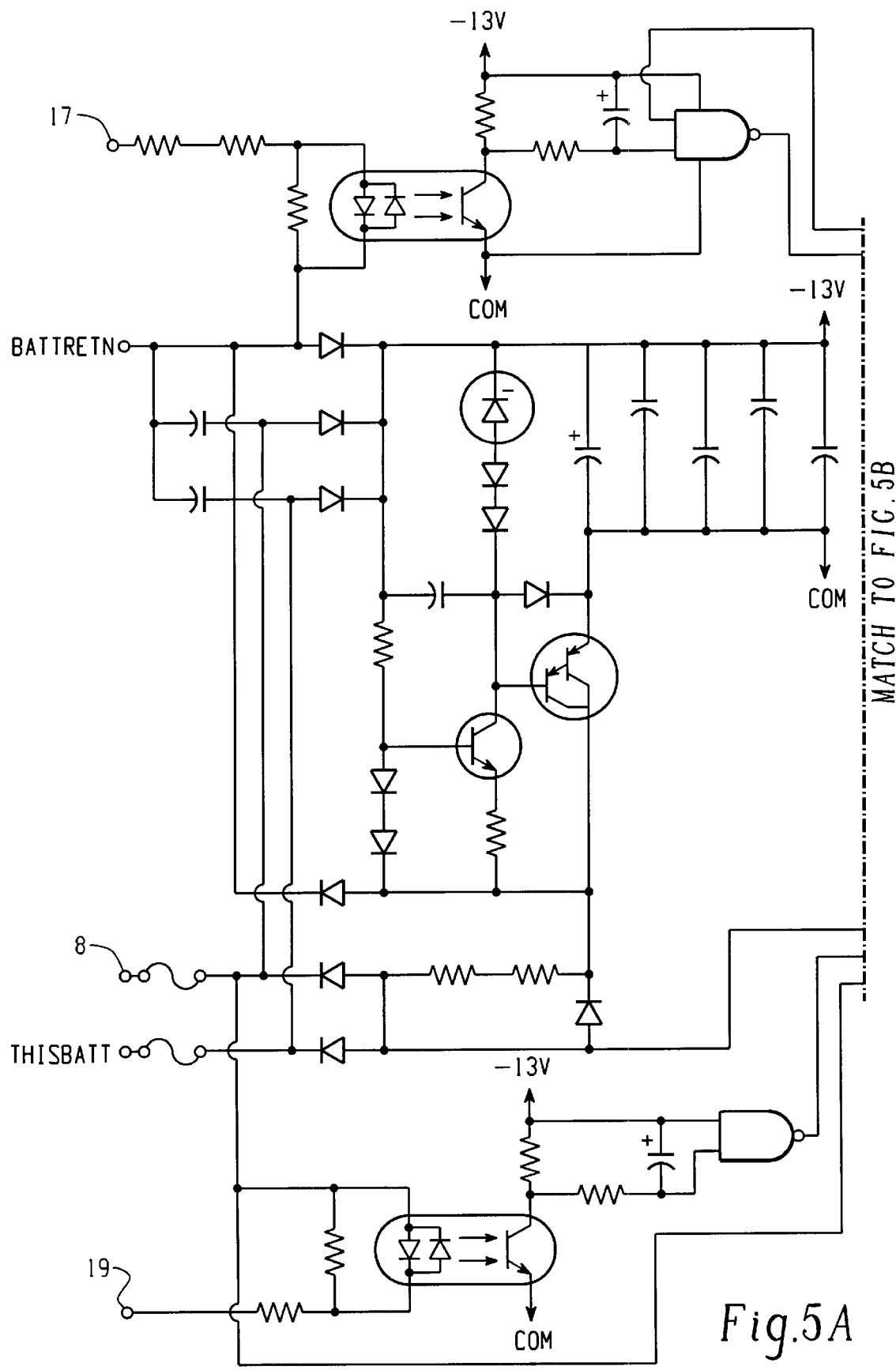
FIGS. 5a and 5b this a more detailed schematic view of a preferred contactor module.
Figure 5B:
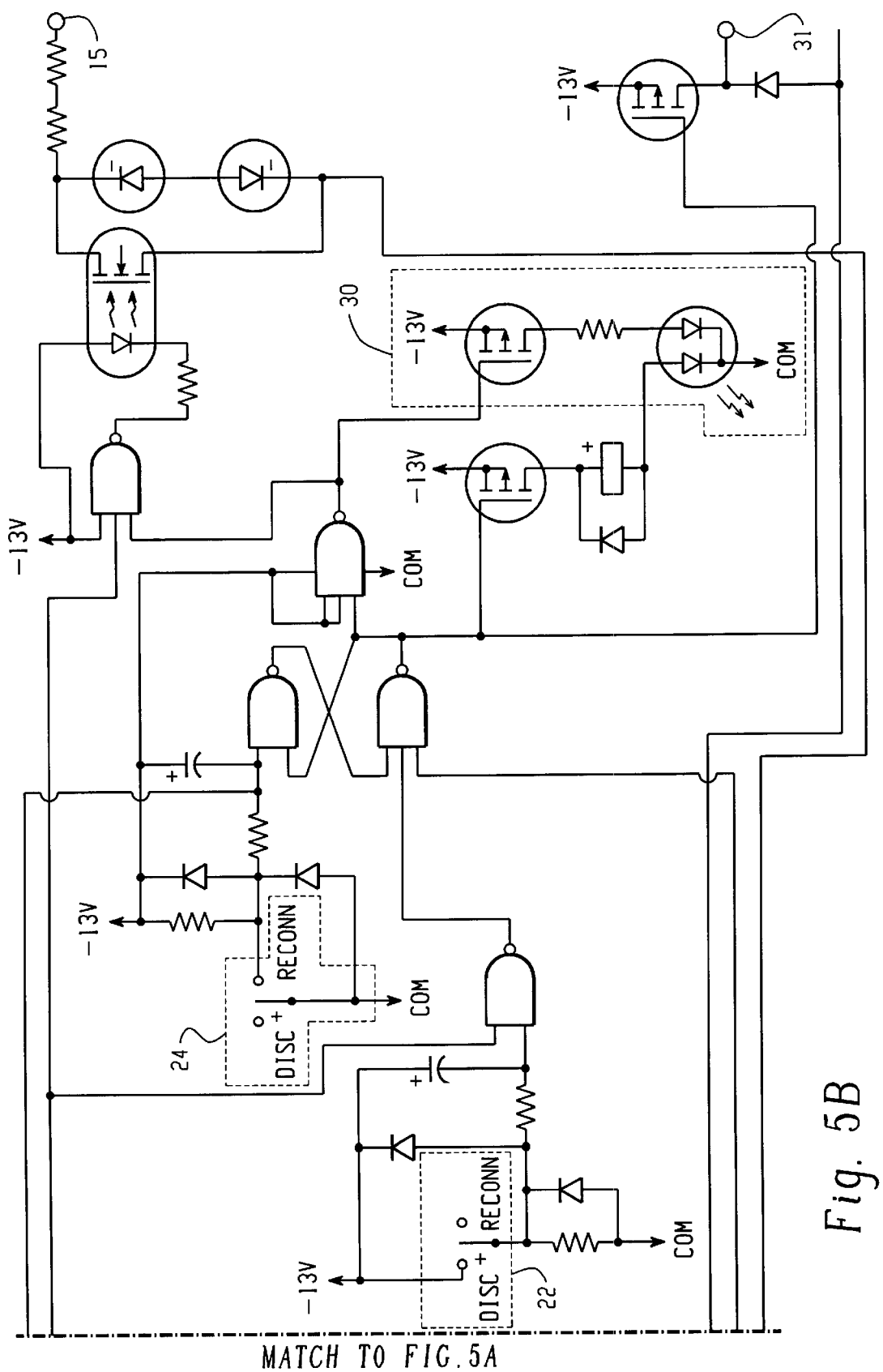

A preferred method for operating the contactor modules 12 within the ring to limit the number of batteries that can be disconnected can be best understood with reference to the functioning of an individual controller 16 wherein all of the controllers 16 have been programmed to allow only one battery 16 to be disconnected at a time. Referring now to FIGS. 4 and 5, shown in FIG. 4 is a preferred logic circuit that performs the function of the controller 16 and FIGS. 5a and 5b is a specific implementation of the preferred logic circuit.

None of the controllers 16 will allow its associated battery 10 to be disconnected if its ENABLE IN 17 is inactive. If a controller's ENABLE IN 17 is inactive, then that controller's disconnect switch 22 is inhibited and the controller 16 will not transmit a control signal to its corresponding contactor 14 to cause it to switch to an open state to disconnect its battery string 10 from the power bus 8.

A controller 16 may allow its associated battery to be disconnected if its ENABLE IN 17 is active and the disconnect switch 22 is activated. If the controller's ENABLE IN 17 is active and its disconnect switch 22 is activated, the controller 16 will transmit a control signal to its contactor 14 to cause the contactor 14 to go to an open state thereby disconnecting its associated battery string 10 from the power bus 8.

Once a controller 16 has disconnected its battery 10, none of the other controllers 16 within the ring can disconnect its battery 10. When a controller 16 has disconnected its battery string 10, the ENABLE OUT 15 of that controller 16 will become inactive. The ENABLE IN 17 of the controller 16 directly coupled to the controller 16 with the disconnected battery will, as a result, become inactive and its ENABLE OUT 15 will also become inactive. In sequence, The ENABLE INs 17 and ENABLE OUTs 15 of all the controllers in the ring will become inactive. Thus, the other controllers 16 will not disconnect their batteries 10 and the ring has become locked.

The controller 16 with the disconnected battery 10 must reconnect its battery 10 before the ring can become unlocked to allow another controller 16 to disconnect its battery 10. The reconnect switch 24 of the controller 16 with the disconnected battery 10 must first be activated. The controller 16 will respond by directing its contactor 14 to the closed state thereby reconnecting the associated battery 10. The controller 16 will also make its ENABLE OUT 15 active. The activation of this ENABLE OUT 15 will cause the ENABLE INs 17 and ENABLE OUTs 15 of all the other controllers 16 in the ring to become active. As a result, all of the controllers 16 will become capable of responding to a disconnect switch 22 to disconnect its battery 10 from the power bus 8.

The preferred controller 16 is implemented using logic circuits and more preferably an S-R latch. One skilled in the art could, however, implement the controller 16 using other logic circuits, microprocessors, software, and other circuits without departing from the spirit of the present invention.

The reconnect and disconnect switches 24 and 22 preferably are two sides of the same rocker switch but, alternatively, could be a number of different devices such as separate push button switches or other types of mechanical switches, electrical devices that provide voltage levels, logic devices that provide logic levels, and others.

Each controller 16 also preferably has an EMERGENCY STOP input 19. The EMERGENCY STOP inputs 19 of all the controllers 16 are preferable coupled together. This provides additional control that can be used in an emergency situation such as a fire to defeat the normal interlock ring logic and cause all of the controllers 16 to disconnect their batteries 10 simultaneously.

Also, in the preferred system if a controller 16 is removed from the ring, the ENABLE IN signal 17 to the next controller 16 will become inactive. In turn, the ENABLE IN 17 of all of the other controllers 16 in the ring will become inactive thereby preventing the other controllers 16 from responding to their disconnect switches 22 until the removed controller 16 is returned to the ring and its reconnect switch 24 is activated.

The ENABLE IN-ENABLE OUT signals 17 and 15 are preferably configured so that an open wire or a wire shorted to ground will be interpreted as an inactive level which will propagate around the ring and prevent all of the controllers 16 from disconnecting their battery strings 10 thereby making the whole system more fail-safe.

The preferred controllers 16 may optionally include an indicator 30 that shows the state of its associated contactor 14. The indicator 30 preferably is a light indicator which is illuminated if the contactor 14 is opened thereby disconnecting the battery 10 from the power bus 8.

The controllers 16 are optionally provided with a remote indicator 32 for indicating to a remote monitoring system (not shown) the state of its associated contactor 14. The remote indicator 32 could comprise a number of devices such as an alarm relay contact, a logic level, a transmitter output or others.

The controllers 16 are optionally provided with a mechanical lockout/tagout feature. The switch 14 preferably is physically located behind a door. When the door is closed, a loop is available for a serviceman to place a padlock on to keep the door from being opened and the switch 14 from being actuated.

Figure 6:
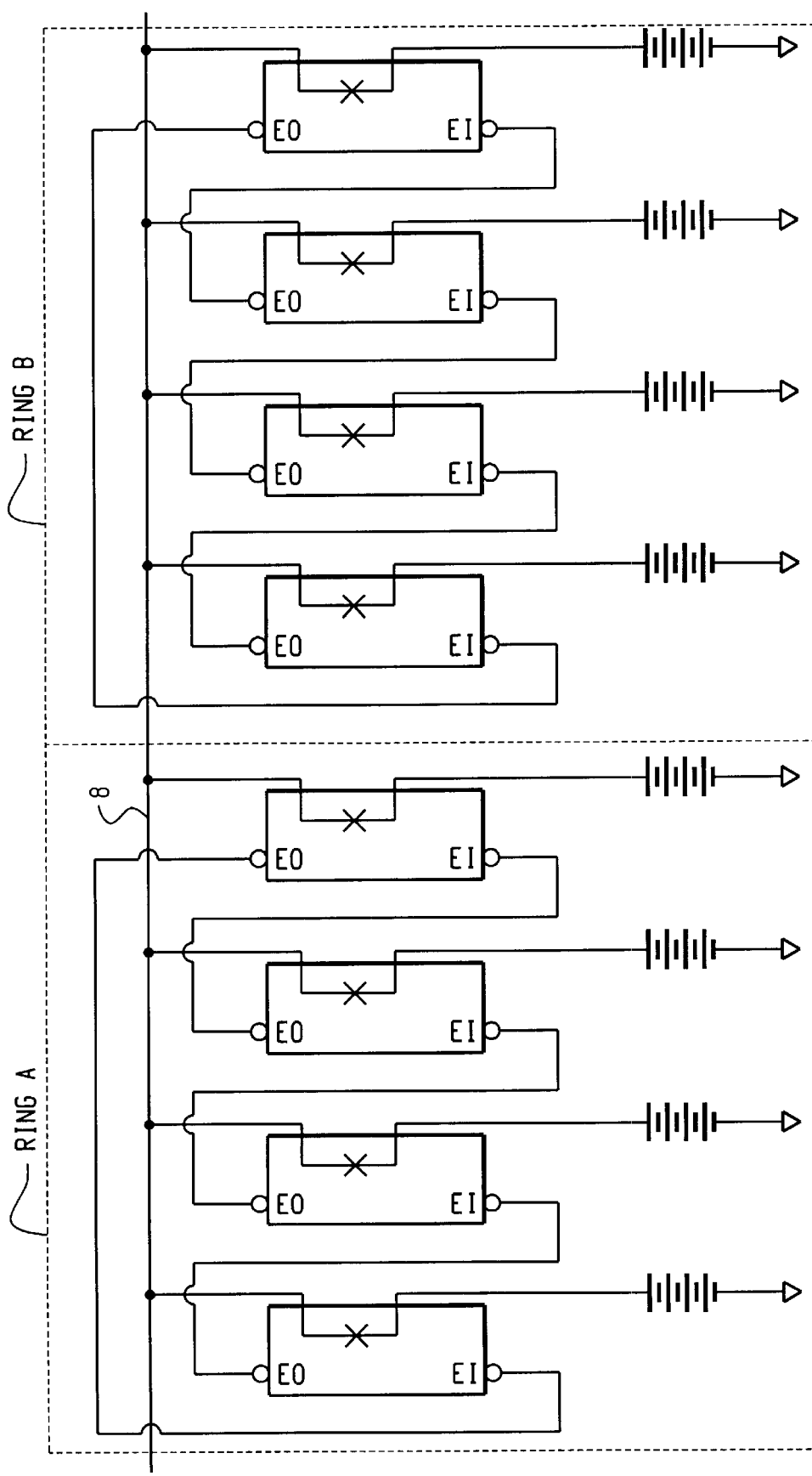
FIG. 6 is a schematic view of a series of contactor modules coupled together such that two rings are formed.

As will be apparent to one skilled in the art, a particular power plant can be arranged in many different configurations such as one in which all of the battery strings are grouped into one ring as illustrated in FIG. 2 or a configuration in which multiple rings exist as is illustrated in the exemplary two ring configuration of FIG. 6.

Having described in detail the preferred and alternate embodiments of the present invention, including preferred modes of operation, it is to be understood that the present invention could be carried out with different elements and steps. For example, one skilled in the art could implement the present invention using different logic circuits, microprocessors, microcontrollers, software, combinations thereof and others without departing from the spirit and scope of the present invention. Also, the present invention could be applied in many different configurations such as through the use of multiple rings, by connecting more than one battery string to a control module, and others without departing from the spirit of the invention. The preferred and alternate embodiments are presented only by way of example and are not meant to limit the scope of the present invention which is defined by the following claims.

What is claimed is:

1. A battery control system for controlling the connection of a plurality of batteries to a load comprising:
   a plurality of switches each of which is operable to connect or disconnect one of the batteries from the load; and
   a plurality of controllers each of which is operatively coupled to one of said switches, each of said controllers being operative to cause one of said switches to disconnect one of the batteries from the load, each of said controllers having an output for communication with another of said controllers, each of said controllers also having an input for communication with another of said controllers, wherein said controllers communicate with each other to limit the number of batteries that can be disconnected from the load.

2. The system of claim 1 wherein said plurality of controllers are arranged in a ring configuration such that the output of the first of said controllers is coupled to the input of the second of said controllers.

3. The system of claim 2 wherein the input of the first of said controllers is coupled to the output of the second of said controllers.

4. The system of claim 2 wherein the input of the first of said controllers is coupled to the output of another of said controllers that is not the first or second of said controllers.

5. The system of claim 2 wherein only one of the batteries that is coupled to a controller in the ring via a switch can be disconnected from the load at a given time.

6. The system of claim 1 wherein said plurality of controllers are arranged in a plurality of ring configurations wherein only one of the batteries that is coupled to a controller in each ring via a switch may be disconnected from the load at a given time.

7. The system of claim 1 wherein each controller further comprises a status indicator, the status indicators being operative to indicate whether the switch coupled to that controller has disconnected one of the batteries from the load.

8. The system of claim 7 wherein the status indicator comprises a light indication.

9. The system of claim 1 wherein each controller further comprises a remote indicator for indicating to a remote monitoring system the state of the switch coupled to that controller.

10. The system of claim 1 wherein the output of each of said controllers communicates information regarding the battery connection state of the battery coupled to that controller to another of said controllers and wherein the input of each of said controllers receives a communication from another of said controllers regarding the battery connection state of the battery coupled to that other of said controllers.

11. The system of claim 1 wherein each of said controllers further comprises a disconnect switch and a reconnect switch, each of said disconnect switches being operative to communicate the desire to disconnect the battery coupled to that controller from the load, each of said reconnect switches being operative to communicate the desire to reconnect the battery coupled to that controller to the load.

12. The system of claim 1 wherein each of said controllers further comprises an emergency stop input, said controller being responsive to said emergency stop input to cause the battery coupled thereto to be disconnected from the load.

13. The system of claim 1 wherein each of said controllers further comprises a control circuit that comprises a logic circuit that uses said inputs for controlling the activation of said outputs.

14. The system of claim 13 wherein said control circuits includes an S-R latch circuit in their logic circuits.

15. The system of claim 1 wherein said switches are coupled in series between the batteries and the load.

16. The system of claim 1 further comprising a power bus coupled between the load and the batteries and wherein said switches are coupled in series between the batteries and said power bus.

17. An UPS system having a plurality of batteries for providing backup power to a load comprising:
    a plurality of switches each of which is operable to connect or disconnect one of the batteries from the load; and
    a plurality of controllers each of which is operatively coupled to one of said switches, each of said controllers being operative to cause one of said switches to disconnect one of the batteries from the load, each of said controllers having an output for communication with another of said controllers, each of said controllers also having an input for communication with another of said controllers, wherein said controllers communicate with each other to limit the number of batteries that can be disconnected from the load.

18. The system of claim 17 wherein said plurality of controllers are arranged in a ring configuration such that the output of the first of said controllers is coupled to the input of the second of said controllers.

19. The system of claim 18 wherein the input of the first of said controllers is coupled to the output of the second of said controllers.

20. The system of claim 18 wherein the input of the first of said controllers is coupled to the output of another of said controllers that is not the first or second of said controllers.

21. The system of claim 18 wherein only one of the batteries that is coupled to a controller in the ring via a switch can be disconnected from the load at a given time.

22. The system of claim 17 wherein said plurality of controllers are arranged in a plurality of ring configurations wherein only one of the batteries that is coupled to a controller in each ring via a switch may be disconnected from the load at a given time.

23. The system of claim 17 wherein each controller further comprises a status indicator, the status indicators being operative to indicate whether the switch coupled to that controller has disconnected one of the batteries from the load.

24. The system of claim 23 wherein the status indicator comprises a light indication.

25. The system of claim 17 herein each controller further comprises a remote indicator for indicating to a remote monitoring system the state of the switch coupled to that controller.

26. The system of claim 17 wherein the output of each of said controllers communicates information regarding the battery connection state of the battery coupled to that controller to another of said controllers and wherein the input of each of said controllers receives a communication from another of said controllers regarding the battery connection state of the battery coupled to that other of said controllers.

27. The system of claim 17 wherein each of said controllers further comprises a disconnect switch and a reconnect switch, each of said disconnect switches being operative to communicate the desire to disconnect the battery coupled to that controller from the load, each of said reconnect switches being operative to communicate the desire to reconnect the battery coupled to that controller to the load.

28. The system of claim 17 wherein each of said controllers further comprises an emergency stop input, said controller being responsive to said emergency stop input to cause the battery coupled thereto to be disconnected from the load.

29. The system of claim 17 wherein each of said controllers further comprises a control circuit that comprises a logic circuit that uses said inputs for controlling the activation of said outputs.

30. The system of claim 29 wherein said control circuits includes an S-R latch circuit in their logic circuits.

31. The system of claim 17 wherein said switches are coupled in series between the batteries and the load.

32. The system of claim 17 further comprising a power bus coupled between the load and the batteries and wherein said switches are coupled in series between the batteries and said power bus.

33. A power plant system for providing power to a load comprising:
  a source of AC power;
  an AC to DC power converter for converting the AC power to DC power and for supplying the DC power to the load;
  an UPS system for providing backup DC power to the load, the UPS system comprising a plurality of batteries;
  a plurality of switches each of which is operable to connect or disconnect one of said batteries from the load; and
  a plurality of controllers each of which is operatively coupled to one of said switches, each of said controllers being operative to cause one of said switches to disconnect one of the batteries from the load, each of said controllers having an output for communication with another of said controllers, each of said controllers also having an input for communication with another of said controllers, wherein said controllers communicate with each other to limit the number of batteries that can be disconnected from the load.

34. The system of claim 33 wherein said plurality of controllers are arranged in a ring configuration such that the output of the first of said controllers is coupled to the input of the second of said controllers.

35. The system of claim 34 wherein the input of the first of said controllers is coupled to the output of the second of said controllers.

36. The system of claim 34 wherein the input of the first of said controllers is coupled to the output of another of said controllers that is not the first or second of said controllers.

37. The system of claim 34 wherein only one of the batteries that is coupled to a controller in the ring via a switch can be disconnected from the load at a given time.

38. The system of claim 33 wherein said plurality of controllers are arranged in a plurality of ring configurations wherein only one of the batteries that is coupled to a controller in each ring via a switch may be disconnected from the load at a given time.

39. The system of claim 33 wherein each controller further comprises a status indicator, the status indicators being operative to indicate whether the switch coupled to that controller has disconnected one of the batteries from the load.

40. The system of claim 39 wherein the status indicator comprises a light indication.

41. The system of claim 33 wherein each controller further comprises a remote indicator for indicating to a remote monitoring system the state of the switch coupled to that controller.

42. The system of claim 33 wherein the output of each of said controllers communicates information regarding the battery connection state of the battery coupled to that controller to another of said controllers and wherein the input of each of said controllers receives a communication from another of said controllers regarding the battery connection state of the battery coupled to that other of said controllers.

43. The system of claim 33 wherein each of said controllers further comprises a disconnect switch and a reconnect switch, each of said disconnect switches being operative to communicate the desire to disconnect the battery coupled to that controller from the load, each of said reconnect switches being operative to communicate the desire to reconnect the battery coupled to that controller to the load.

44. The system of claim 33 wherein each of said controllers frrther comprises an emergency stop input, said controller being responsive to said emergency stop input to cause the battery coupled thereto to be disconnected from the load.

45. The system of claim 33 wherein each of said controllers further comprises a control circuit that comprises a logic circuit that uses said inputs for controlling the activation of said outputs.

46. The system of claim 45 wherein said control circuits includes an S-R latch circuit in their logic circuits.

47. The system of claim 33 wherein said switches are coupled in series between the batteries and the load.

48. The system of claim 33 further comprising a power bus coupled between the load and the batteries and wherein said switches are coupled in series between the batteries and said power bus.

* * * * *